United States Patent [19]

Costanza et al.

[11] 4,077,858

[45] Mar. 7, 1978

[54] COMPLETELY POLYMERIZED ULTRAVIOLET CURED COATINGS

[75] Inventors: John R. Costanza, North Plainfield; George L. Collins, Murray Hill, both of N.J.

[73] Assignee: Celanese Corporation, New York, N.Y.

[21] Appl. No.: 729,559

[22] Filed: Oct. 4, 1976

[51] Int. Cl.² .......................... C08F 2/50; C08F 4/00
[52] U.S. Cl. ............................................... 204/159.23
[58] Field of Search ..................... 204/159.23, 159.16

[56] References Cited

U.S. PATENT DOCUMENTS

| | | | |
|---|---|---|---|
| 3,380,831 | 4/1968 | Cohen et al. | 96/115 P |
| 3,759,807 | 9/1973 | Osborn et al. | 204/159.23 |

*Primary Examiner*—Walter C. Danison

[57] ABSTRACT

The use of an aliphatic saturated ether as a promoter to insure complete polymerization of residual unsaturation in ultraviolet curable coating compositions is disclosed.

4 Claims, No Drawings

COMPLETELY POLYMERIZED ULTRAVIOLET CURED COATINGS

BACKGROUND OF INVENTION

This invention relates to ultraviolet curable coating compositions. More particularly, this invention relates to ultraviolet curable coating compositions which are polymerizable more completely.

Because of the low incident energy utilized and the limited reaction time due to rapid crosslinking in ultraviolet coatings, most of these coatings are not completely cured after ultraviolet exposure. Often as high as twenty to forty percent of the unsaturated groups initially present in the coating remain present after exposure to ultraviolet radiation. Thus, ultraviolet curable coatings after initial curing are not as completely cured as might be desirable. Furthermore, the remaining unsaturation groups are subject to attack from a variety of sources, including sulfur dioxide, oxygen, oxidizing agents, reducing agents, solvents, sunlight, mineral acids, and the like.

The use of certain types of unsaturated ether compounds in ultraviolet curable coating compositions is known. See U.S. Pat. No. 3,380,831. However, these compositions become tied into the ultraviolet composition itself through the unsaturation present, thereby limiting their ability to defuse and react.

Thus, it is an object of this invention to prepare ultraviolet curable coating compositions.

It is another object of this invention to prepare ultraviolet curable coating compositions which, after exposure to ultraviolet light, are more completely cured.

It is another object of this invention to prepare ultraviolet curable coating compositions which exhibit improved chemical resistance, adhesion, and the like.

These and other objectives are obtained by preparing the compositions of the instant invention.

SUMMARY OF INVENTION

Basically, the instant invention involves the discovery that typical ultraviolet curable coating compositions, i.e., compositions prepared from about 30 to about 95 percent, by weight, based on the total composition, of an alpha beta ethylenically unsaturated vinyl polymerizable compound containing at least two alpha beta ethylenic unsaturation groups per molecule, up to 65 percent, by weight, or an alpha beta ethylenically unsaturated vinyl polymerizable compound containing a single site of alpha beta ethylenic unsaturation, and about 0.01 to about 15 percent, by weight, of an ultraviolet photoinitiator, may be more completely polymerized and cured following ultraviolet exposure if they are compounded with 5 to about 50 percent, by weight, preferably about 5 to about 25 percent, based on the total system, of an aliphatic saturated ether.

DESCRIPTION OF INVENTION

The ether compositions useful in the instant invention are saturated, aliphatic and contain no groups interferingly reactive with the ultraviolet curing mechanism. In addition, the ethers are preferably liquid under ambient conditions or are at least soluble in the ultraviolet system itself, so that the final ultraviolet product is a liquid under ambient conditions. Examples of the ethers include: the monoethers, such as diethyl ether, dibutyl ether, dipropyl ether, methylethyl ether, and the like; the polyethers of molecular weights below about 750, such as polymethylene glycol, polyethylene glycol, polypropylene glycol, polybutylene glycol, polytetrahydrofuran, and the like; ether alcohols, such as the various ethers of propylene glycol and ethylene glycol, including monoethyl ethers of ethylene glycol, monomethyl ethers of propylene glycol, ether esters such as ethyl ethyleneglycol acetate and the like.

Other ethers include the polyethers obtained from the polymerization of four-, five-, six- and seven-membered saturated cyclic ethers.

The most preferred ethers are low molecular weight polyethylene oxide ethers. This is due in part to their stability, solubility, low cost and high concentration of ethylene-bridged ether groups. Polymethylene ethers are also preferred if stabilized against de-polymerization. However, most polymethylene ethers are insoluble in the system utilized in this invention and are therefore of little use.

The ultraviolet curable compositions of the instant invention contain from about 30 to about 95 percent, by weight, based upon the total curable composition, of an alpha beta ethylenically unsaturated vinyl polymerizable compound containing at least two vinyl polymerizable groups per molecule. Included are unsaturated esters of the alpha methylene carboxylic acids., e.g., ethylene diacrylate, diethylene glycol diacrylate, glycerol diacrylate, glycerol triacrylate, ethylene dimethacrylate, 1,3-propanediol dimethacrylate, 1,2,4-butanetriol trimethacrylate, 1,4-cyclohexanediol diacrylate, 1,4-benzenediol dimethacrylate, pentaerythritol tri- and tetra- acrylate and methacrylate, dipentaerythritol hexacrylate, tripentaerythritol hexacrylate, tripentaerythritol octaacrylate, trimethylol propane triacrylate, trimethylolethane triacylate, sorbitol hexacrylate, 1,3-propanediol diacrylate, 1,5-pentanediol dimethacrylate, hexanediol diacrylate, the bis-acrylates and methacrylates of polyethylene glycols of a molecular weight of 200–1500, and the like; unsaturated amides, particularly those of the alpha methylene carboxylic acids, especially those of alpha, omega-diamines and oxygen-interrupted omega-diamines, such as methylene bis-acrylamide, methylene bis-methacrylamide, ethylene bis-methacrylamide, 1,6-hexamethylene bis-acrylamide, diethylene triamine tris-methacrylamide, bis(gammamethacrylamidopropoxy)ethane, beta-methacrylamidoethyl methacrylate, N-beta-hydroxy-ethyl-beta-(methacrylamido) ethyl acrylate, and N,N-bis(beta-methacryloxyethyl) acrylamide; vinyl esters such as divinyl succinate, divinyl adipate, divinyl phthalate, divinyl terephthalate, divinyl benzene-1,3-disulfonate, and divinyl benzene-1,4-disulfonate; styrene and derivatives thereof and unsaturated aldehydes, such as sorbaldehyde (hexadienal). An outstanding class of these preferred addition polymerizable components are the esters and amides of alpha-methylene carboxylic acids and substituted carboxylic acids with polyols and polyamides wherein the molecular chain between the hydroxyl and amino groups is solely carbon or oxygen-interrupted carbon.

The polyethylenic unsaturation can be present as a substituent attached to a preformed polymer resin, such as an alkyd, a polyester, a polyamide, a polyurethane or a vinyl homo- or copolymer. Also included are polymers containing maleic and fumaric acids or esters, as well as polymeric unsaturated materials prepared by reacting vinyl hydroxy or carboxy materials with polyepoxides, e.g., acrylic acid with the diglycidyl ether of bisphenol A. Also included are polymers such as polyvinyl acetate/acrylate, cellulose acetate/acrylate, cellulose acetate/methacrylate, N-acryloxymethylpolyamide, N-methacryloxymethylpolyamide, allyloxymethylpolyamide, etc.

In addition to the aforementioned polyfunctional polymerizable compounds, compounds containing a single polymerizable ethylenically unsaturated group of the structure

can also be utilized. In addition to traditional "monomers", as described hereafter, the monounsaturated compounds may be polymeric materials, as previously described, containing on the average a single site of unsaturation on each polymer molecule. These monomers can be aliphatic, aromatic, cycloaliphatic or any variant thereof. Among the monomers are included styrene, 4-methylstyrene, alphamethylstyrene, and the like; acrylic acid and its nitrile, amide and $C_1$-$C_{12}$ alkyl, aryl, or hydroxy alkyl derivatives, such as acrylonitrile, ethylacrylate, 2-ethylhexyl acrylate, butoxy- or ethoxyethyl acrylates, hydroxyethyl acrylate, as well as others; the vinyl halides, such as vinyl chloride, vinylidene chloride, and the like; vinyl ketones such as vinyl phenyl ketone, vinyl methyl ketone, alpha-chlorovinyl methyl ketone, and the like; the vinyl thioethers such as vinyl ethyl sulfide, vinyl p-tolylsulfide, divinyl sulfide, and the like. Other monomers include vinyl ethyl sulfone, vinyl ethyl sulfoxide, vinyl sulfonic acid, sodium vinyl sulfonate, vinyl sulfonamide, vinyl pyridine, N-vinyl pyrrolidone, N-vinyl carbazole, and the like. Generally any alpha beta ethylenically unsaturated monomer which does not interfere with the ultraviolet curing mechanism may be utilized, and as such, these monomers are well known in the art.

These compounds may be added in amounts up to about 65 percent, by weight, based upon the total curable composition, preferably about 10 to about 30 percent.

Preferred among the monofunctional monomers listed above are the acrylates and styrene.

The instant invention can also contain up to about 60 percent, by weight, based upon the total curable system of a polymeric material containing no polymerizable unsaturation. Among the polymers are the polyolefins and modified polyolefins, the vinyl polymers, the polyethers, the polyesters, the polylactones, the polyamides, the polyurethanes, the polyureas, the polysiloxanes, the polysulfides, the polysulfones, the polyformaldehydes, the phenol-formaldehyde polymers, the natural and modified natural polymers, the heterocyclic polymers, and the like.

Illustrative of these polymers are the acrylic polymers such as poly(acrylic acid), poly(methyl acrylate), poly(ethyl acrylate), poly(methacrylic acid), poly(methyl methacrylate), poly(ethyl methacrylate); poly(vinyl chloride); poly(vinyl alcohol); poly(ethylene/propylene/5-ethylidenebicyclo[2.2.1]-hept-2-ene); polyethylene; polypropylene; synthetic rubbers, e.g., butadiene/acrylonitrile copolymers and chloro-2-butadiene 1,3 polymers; the polyesters, copolyesters, polyamides and copolyamides, such as polycaprolactone, poly(caprolactone/vinyl chloride), poly(ethylene glycol terephthalate), poly(hexamethylene succinate), poly(hexamethylene maleate), poly(hexamethylene carbonate), poly(caprolactam), poly(hexamethylene adipamide), and the like; the polyethers such as poly(glutaraldehyde), polyethylene oxide, polypropylene oxide, poly(tetrahydrofuran), polycyclohexene oxide, copolymers of ethylene oxide and propylene oxide with starters containing reactive hydrogen atoms such as the mixed copolymers using ethylene glycol, glycerol, sucrose, etc., as the starter; vinylidene polymers and copolymers, e.g., vinylidene chloride/acrylonitrile, vinylidene chloride/methacrylate and vinylidene chloride/vinyl acetate polymers; ethylene/vinyl acetate copolymers; the polyureas and polyurethanes, such as described in Polyurethanes: Chemistry and Technology, Volumes I and II, Sanders and Frisch, published by Interscience Publishers; the polycarbonates; polystyrenes; polyvinyl acetals, e.g., polyvinyl butyral, polyvinyl formal; the cellulose ethers, e.g., methyl cellulose, ethyl cellulose, and benzyl cellulose; the cellulose esters, e.g., cellulose acetate, cellulose acetate succinate and cellulose acetate butyrate; and well as the natural and modified natural polymers such as gutta percha, cellulose, gelatin, starch, silk, wool, and the like; the siloxane polymers and copolymers; the formaldehyde polymers such as polyformaldehyde; formaldehyde resins such as phenol-formaldehyde, melamine-formaldehyde, urea-formaldehyde, anilineformaldehyde and acetone-formaldehyde; phenolic resins and the like.

If desired, the compositions of this invention can also contain immiscible polymeric or nonpolymeric organic or inorganic fillers or reinforcing agents, e.g., the organophilic silicas, bentonites, silica, powdered glass, colloidal carbon, as well as various types of dyes and pigments, such as titanium dioxide.

In order to sensitize the compositions of the instant invention to ultraviolet light, certain photosensitizers or initiators are utilized. These fall into many classes and include compounds such as benzoin derivatives, as disclosed in German Patent No. F523401VC/396, acetophenone, propiophenone, xanthone, fluorenone, benzaldehyde, fluorene, anthraquinone, triphenylamine, carbazole, 3- or 4-methylacetophenone, 3- or 4-pentylacetophenone, 3- or 4-methoxyacetophenone, 3- or 4-bromoacetophenone, 3- or 4-allylacetophenone, p-diacetylbenzene, 3- or 4-methoxybenzophenone, 3- or 4-methylbenzophenone, 3- or 4-chlorobenzophenone, 4,4'-dimethoxybenzophenone, 4-chloro-4'-benzylbenzophenone, 3-chloroxanthone, 3,9-dichloroxanthone, 3-chloro-8-nonylxanthone, 3-methoxyxanthone, 3-iodo-7-methoxyxanthone, thioxanthones, chlorinated thioxanthones, and the like.

Also included are the acetophenone photosensitizers of the type described in U.S. Pat. No. 3,715,293, having the structure

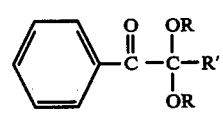

wherein R is alkyl of from 1–8 carbon atoms, or aryl with 6 carbon atoms, and R' is hydrogen, alkyl of from 1–8 carbon atoms, aryl of from 6–14 carbon atoms or cycloalkyl of 5–8 carbon atoms.

The alkylphenone photosensitizers having the formula the benzophenone type photosensitizers having the formula

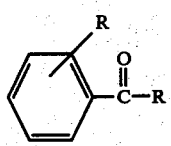   II.

the tricyclic fused ring type having the formula

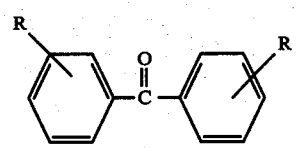   III.

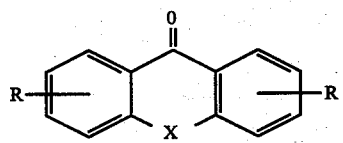   IV.

and the pyridyl type having the formula

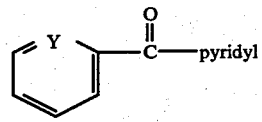   V.

wherein the various substituents are as further described in U.S. Pat. No. 3,759,807, are also included.

Other photosensitizers include 1- and 2-chloroanthraquinone, 2-methylanthraquinone, 2-tertiary butyl anthraquinone, octamethylanthraquinone, 1-4-naphthoquinone, 9-10-phenanthrenequinone, 1,2-benzanthraquinone, 2-3-benzathraquinone, 2-methyl-1,4-naphthoquinone, 2-3-dichloronaphthoquinone, 1-4-dimethylanthraquinone, 2-3-dimethylanthraquinone, 2-phenylanthraquinone, 2-3-diphenylanthraquinone, sodium salts of anthraquinone alphasulfonic acid, 3-chloro-2-methylanthraquinone, and the like. Other photoinitiators which are also useful are described in U.S. Pat. No. 2,760,863 and include vicinal ketadonyl compounds, such as diacetyl benzyl, etc., alpha ketadonyl alcohols, such as benzoin, pivaloin, etc., acyloin ethers, e.g., benzoin methyl and ethyl ethers, etc., alpha hydrocarbon substituted aromatic acyloins, including alphamethyl benzoin, alphaallyl benzoin, and alpha phenyl benzoin. Also included are the diacylhalomethanes, corresponding to one of the general formulas:

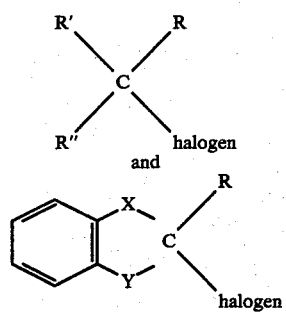

wherein halogen represents a halogen atom such as chlorine or bromine; R represents a hydrogen atom, a chlorine or bromine atom, or an acetyloxy group; R' and R" (same or different) represent a benzoyl group, a nitrobenzoyl group, a dimethylamino benzoyl group, a phenyl sulfonyl group, a carboxy phenyl sulfonyl group, a methylphenyl sulfonyl group, or a naphthoyl group; and X and Y (same or different) represent a carbonyl group or a sulfonyl group. Included are 2-bromo-1,3-diphenyl-1,3-propane dione; 2,2-dibromo-1,3-indane dione; 2,2-dibromo-1,3-diphenyl-1,3-propane dione; 2-bromo-2-(phenylsulfonyl acetal phenone) and the like, as further described in U.S. Pat. No. 3,615,455.

Other photoinitiators are cataloged by G. Delzenne in Industrie Cimique Belge, 24 (1959), 739–764. Most preferred among the added initiators are benzoin and its alkyl ethers, benzophenone and its derivatives, as in Formula III, xanthone, thioxanthones, chlorinated thioxanthones, and acetophenone derivatives, as set out in Formula I, and halogenated, aliphatic and aromatic polychlorinated biphenyls and polyphenyls.

The prior art photosensitizers can be added in an amount of about 0.01 to about 15 percent, by weight, based upon the total curable system, preferably about 0.1 to about 5 percent.

Although not required, for some photoinitators, such as the benzoin ethers, certain organic amines can be added to the photosensitizers above-described to further enhance the cure rate of the compositions of the instant invention in amounts up to about 500 percent, by weight, of the photosensitizer, preferably up to about 50 percent, by weight. The amines can be primary, secondary, or tertiary, and can be represented by the general formula:

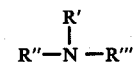

wherein R' and R' taken singly can be hydrogen, linear or branched alkyl having from 1 to about 12 carbon atoms, linear or branched alkenyl having from 2 to about 12 carbon atoms, cycloalkyl having from 3 to about 10 ring carbon atoms, cycloalkenyl having from 3 to about 10 ring carbon atoms, aryl having from 6 to about 12 ring carbon atoms, alkaryl having 6 to about 12 ring carbon atoms; R''' has the same meaning as R' and R" with the exception that it cannot be hydrogen and that it cannot be aryl when both R' and R" are aryl. When taken together R" and R''' can be a divalent alkylene group $-(C_nH_{2n})-$ having from 2 to about 12 carbon atoms, a divalent alkenylene group $-(C_nH_{2n-1})-$ having from 3 to about 10 carbon atoms, a divalent alkadienylene group $-(C_nH_{2n-2})-$ having from 5 to about 10 carbon atoms, a divalent alkatrienylene group $-(C_nH_{2n-3})-$ having from 5 to about 10 carbon atoms, a divalent alkyleneoxyalkylene group $-(C_xH_{2x}OC_xH_{2x})-$ having a total of from 4 to about 12 carbon atoms, or a divalent alkyleneaminoalkylene group $$-(C_xH_{2x}NC_xH_{2x})-$$
$$\phantom{-(C_xH_{2x}N}|\phantom{C_xH_{2x})-}$$
$$\phantom{-(C_xH_{2x}N}R'\phantom{C_xH_{2x})-}$$

having a total of from 4 to about 12 carbon atoms. As previously indicated, the amines can be substituted with other groups; thus, the R', R" and R''' variables, whether taken singly or together, can contain one or more substituents thereon. The nature of such substituents is generally not of significant importance and any substituent group can be present that does not exert a pronounced deterrent effect on the ultraviolet cross-linking reaction.

Illustrative of suitable organic amines one can mention are methylamine, dimethylamine, trimethylamine, diethylamine, triethylamine, propylamine, isopropylamine, diisopropylamine, triisopropylamine, butylamine, tributylamine, t-butylamine, 2-methylbutylamine, N-methyl-N-butylamine, di-2-methylbutylamine, trihexylamine, tri-2-ethylhexylamine, dodecylamine, tridodecylamine, tri-2-chloroethylamine, di-2-bromoethylamine, methanolamine, ethanolamine, diethanolamine, triethanolamine, methyldiethanolamine, dimethylethanolamine, isopropanolamine, propanolamine, diisopropanolamine, triisopropanolamine, butylethanolamine, dihexanolamine, 2-methoxyethylamine, di-2-ethylhexylamine, tri-2-ethoxyethylamine, 2-hydroxyethyldiisopropylamine, 2-aminoethylethanolamine, allylamine, butenylamine, dihexadienylamine, cyclohexylamine, tricyclohexylamine, trimethylcyclohexylamine, bis-methylcyclopentylamine, tricyclohexenylamine, tricyclohexadienylamine, tricyclopentadienylamine, N-methyl-N-cyclohexylamine, N-2-ethylhexyl-N-cyclohexylamine, diphenylamine, phenyldimethylamine, methylphenylamine, ditolylamine, trixylyl-amine, tribenzylamine, triphenethylamine, benzyldimethylamine, benzyldihexylamine, trischlorophenethylenimine, N-methylethylenimine, N-cyclohexylethylenimine, piperidine, N-ethylpiperidine, 2-methylpiperidine, 1,2,3-4-tetrahydropyridine, 1,2-dihydropyridine, 2-, 3- and 4-picoline, morpholine, N-methyl morpholine, N-2-hydroxyethylmorpholine, N-2-ethoxyethylmorpholine, piperazine, N-methylpiperazine, N,N"-dimethylpiperazine, 2,2-dimethyl-1,3-bis[3-(N-morpholinyl)-propionyloxy]propane, 1,5-bis[3-(N-morpholinyl)-propionyloxy]diethyl ether, and the like. The preferred organic amines are the tertiary amines, with the alkanol amines being most preferred. The specific preferred amine activators are triethanolamine, morpholine and methyldiethanolamine.

The compositions of the instant invention after being prepared in the ratios as set out above can be applied to the material to be coated by conventional means, including brushing, spraying, dipping, curtain and roll coating techniques, and may, if desired, be dried under ambient or oven conditions to provide coating films on the substrate. The substrate can be of any composition, e.g., wood, metal, paper, plastic, fabric, fiber, ceramic, concrete, plaster, glass, etc.

Typically a mixture of the composition of the instant invention in combination with the organic photosensitizer and, where utilized, the amine activator and the ethers as described herein, is prepared and the composition applied to the desired substrate. It is then exposed to electromagnetic radiation having wave lengths of above about 2,000 Angstrom units, preferably from about 2,000 up to about 5,000 Angstroms. Exposure should be from a source located about 1 to 5 inches from the coating for a time sufficient to cause crosslinking of the composition and can range from about 0.1 seconds up to about 1 min./linear ft. Generally the light radiation will have power of about 200 watts per linear foot.

The light radiation can be ultraviolet light generated from low, medium and high pressure mercury lamps. This equipment is readily available and its use is well known to those skilled in the art of radiation chemistry.

In the following examples all parts and percentages are by weight unless otherwise indicated.

EXAMPLE 1

An ultraviolet curable coating composition was prepared containing 50 parts trimethylolpropane triacrylate, 30 parts hexanediol diacrylate, and 20 parts of hydroxyethyl acrylate. To this mixture were added 3 parts of benzophenone photoinitiator and 3 parts diethanol amine activator. A 0.5 mil film of this composition was drawn down on a sodium chloride disk and exposed for 2 seconds to a 200 watt per linear inch Hanovia ultraviolet lamp. Residual unsaturation was measured on an infrared spectro-photometer and determined to be 30 percent of the pre-exposure level.

EXAMPLE 2

Example 1 was repeated with four separate polyethylene oxide copolymers having weight average molecular weights respectively of 200, 400, 600 and 800. Each was added in separated tests at the 10 percent by weight level to the composition of Example 1. Each composition was then cured by ultraviolet exposure on a sodium chloride plate as described in Example 1 and evaluated for residual unsaturation. The level in each instance ranged between 2 and 5 percent.

EXAMPLE 3

Example 1 was repeated with separate 10 percent by weight additions of polypropylene oxide materials having respectively 200 and 800 weight average molecular weights. In each case, the residual unsaturation after ultraviolet exposure was found to be less than 5 percent.

EXAMPLE 4

Similar results were obtained when a polymerized tetrahydrofuran having a weight average molecular weight of about 400 was added to the composition of Claim 1 at the 10 percent, by weight, level.

In each of the above modified examples, the films which were obtained were non-yellowing. No weight loss was observed on the cured films. Shrinkage of the modified films was substantially lower than that of the unmodified Example 1 films.

What is claimed is:

1. In an ultraviolet coating composition containing, based on the total weight of the system, about 30 to about 95 percent of an alpha beta ethylenically unsaturated vinyl polymerizable compound containing at least about 2 sites of vinyl polymerizable unsaturation, up to about 65 percent, by weight, on the same basis, of an alpha beta ethylenically unsaturated vinyl polymerizable compound containing a single site of alpha beta ethylenic unsaturation, and about 0.01 to about 15 percent, on the same basis, of an ultraviolet photoinitiator, the improvement of which comprises utilizing about 5 to about 50 percent, by weight, based on the total ultraviolet curable system, of an aliphatic saturated ether containing no other groups interferingly reactive with the ultraviolet cross-linking mechanism.

2. The composition of claim 1 in admixture with up to about 50 percent, by weight, based on the photoinitiator, of an amine activator.

3. The composition of claim 1 wherein the ether is selected from polyethylene glycol ethers, polypropylene glycol ethers, or polybutylene glycol ethers.

4. The composition of claim 3 wherein the ether is a polyethylene glycol.

* * * * *